(12) United States Patent
Ryuno

(10) Patent No.: US 11,919,571 B2
(45) Date of Patent: Mar. 5, 2024

(54) COWL DRAIN STRUCTURE FOR AN ELECTRIC VEHICLE

(71) Applicants: TOYOTA JIDOSHA KABUSHIKI KAISHA, Toyota (JP); SUBARU CORPORATION, Tokyo (JP)

(72) Inventor: Yoshiyuki Ryuno, Nagoya (JP)

(73) Assignees: TOYOTA JIDOSHA KABUSHIKI KAISHA, Toyota (JP); SUBARU CORPORATION, Tokyo (JP)

(*) Notice: Subject to any disclaimer, the term of this patent is extended or adjusted under 35 U.S.C. 154(b) by 398 days.

(21) Appl. No.: 17/357,297

(22) Filed: Jun. 24, 2021

(65) Prior Publication Data
US 2022/0055693 A1    Feb. 24, 2022

(30) Foreign Application Priority Data

Aug. 21, 2020   (JP) ................................. 2020-140370

(51) Int. Cl.
| | | |
|---|---|---|
| B60L 53/16 | (2019.01) | |
| B60L 53/18 | (2019.01) | |
| B62D 25/08 | (2006.01) | |

(52) U.S. Cl.
CPC ............ B62D 25/081 (2013.01); B60L 53/16 (2019.02); B60L 53/18 (2019.02); B62D 25/082 (2013.01)

(58) Field of Classification Search
CPC ....... B62D 25/081; B60L 53/18; Y02T 90/14; B60R 13/07
See application file for complete search history.

(56) References Cited

U.S. PATENT DOCUMENTS

| | | | |
|---|---|---|---|
| 2015/0034400 A1* | 2/2015 | Amano | B60L 50/66 180/65.8 |
| 2015/0232128 A1* | 8/2015 | Naoi | B62D 25/145 296/187.09 |
| 2015/0360732 A1 | 12/2015 | D'Andrea et al. | |
| 2019/0176896 A1 | 6/2019 | Anegawa et al. | |

FOREIGN PATENT DOCUMENTS

| | | |
|---|---|---|
| JP | 2003-104238 A | 4/2003 |
| JP | 2014-136531 A | 7/2014 |
| JP | WO2013/073327 A1 | 4/2015 |
| JP | 2018-167657 A | 11/2018 |
| JP | 2019-104328 A | 6/2019 |

* cited by examiner

Primary Examiner — Jason D Shanske
Assistant Examiner — James J Triggs
(74) Attorney, Agent, or Firm — Oliff PLC

(57) ABSTRACT

An electric vehicle may include: a cowl; a charging lid disposed outward of the cowl in a vehicle width direction, and a charging cable disposed between the cowl and the charging lid. A drain hole is defined in a bottom wall of the cowl, the bottom wall of the cowl may include a first bottom wall portion and a second bottom wall portion, the first bottom wall portion is located more proximate to a central portion of the cowl than the second bottom wall portion, the second bottom wall portion is located between the first bottom wall portion and the drain hole and is adjacent to the drain hole, and an inclination angle of a surface of the second bottom wall portion is greater than an inclination angle of a surface of the first bottom wall portion.

6 Claims, 4 Drawing Sheets

COWL DRAIN STRUCTURE FOR AN ELECTRIC VEHICLE

CROSS-REFERENCE TO RELATED APPLICATION

This application claims priority to Japanese Patent Application No. 2020-140370 filed on Aug. 21, 2020, the contents of which are hereby incorporated by reference into the present application.

TECHNICAL FIELD

The technology disclosed herein relates to an electric vehicle. The electric vehicle herein broadly refers to a vehicle of which motor drives one or more wheels. For example, the electric vehicle includes a rechargeable electric automobile charged by an external power source, a hybrid vehicle additionally including an engine, and the like.

BACKGROUND

To prevent entry of rainwater or the like into an engine room, a cowl extending along a vehicle width direction is disposed between a windshield and a hood. Japanese Patent Application Publication No. 2018-167657 describes a cowl including a drain hole defined in a side wall at an edge of the cowl in a vehicle width direction. Rainwater or the like that has entered the cowl is drained through the drain hole defined in the side wall.

SUMMARY

Some electric vehicles may include a charging lid formed at, for example, an upper portion of a fender panel and serving as a port to be opened and closed for a charging port. The upper portion of the fender panel is disposed at a position opposing an edge of a cowl along a vehicle width direction. Thereby, when the charging lid is formed at the upper portion of the fender panel, a part of a charging cable connected to the charging port is arranged in proximity to the edge of the cowl in the vehicle width direction.

As in Japanese Patent Application Publication No. 2018-167657, when the drain hole is defined in the side wall of the edge of the cowl in the vehicle width direction, a part of the charging cable may be wetted by rainwater or the like drained from the drain hole. The present disclosure provides a technology that can prevent a charging cable from being wetted in an electric vehicle including a cowl.

The technology disclosed herein is implemented as an electric vehicle. An electric vehicle may comprise: a cowl; a charging lid disposed outward of the cowl in a vehicle width direction, and a charging cable disposed between the cowl and the charging lid. A drain hole is defined in a bottom wall of the cowl. The bottom wall of the cowl may comprise a first bottom wall portion and a second bottom wall portion. The first bottom wall portion is located more proximate to a central portion of the cowl than the second bottom wall portion. The second bottom wall portion is located between the first bottom wall portion and the drain hole and is adjacent to the drain hole. An inclination angle of a surface of the second bottom wall portion is greater than an inclination angle of a surface of the first bottom wall portion.

In the above-described electric vehicle, the drain hole is defined in the bottom wall of the cowl. Thereby, rainwater or the like that has entered the cowl can be prevented from being drained outward of the cowl in the vehicle width direction. Consequently, the charging cable disposed between the cowl and the charging lid can be prevented from being wetted.

Furthermore, in the above-described electric vehicle, the inclination angle of the surface of the second bottom wall portion adjacent to the drain hole is large. Usually, when a drain hole is defined in a bottom wall of a cowl, this has difficulty in discharging solid matter such as fallen leaves from the drain hole. In the above-described electric vehicle, by virtue of the large inclination angle of the surface of the second bottom wall portion, such solid matter can be discharged smoothly from the drain hole. As such, in the above-described electric vehicle, the charging cable can be prevented from being wetted while faulty discharge of solid matter such as fallen leaves is reduced.

DETAILED DESCRIPTION

Figure 1:
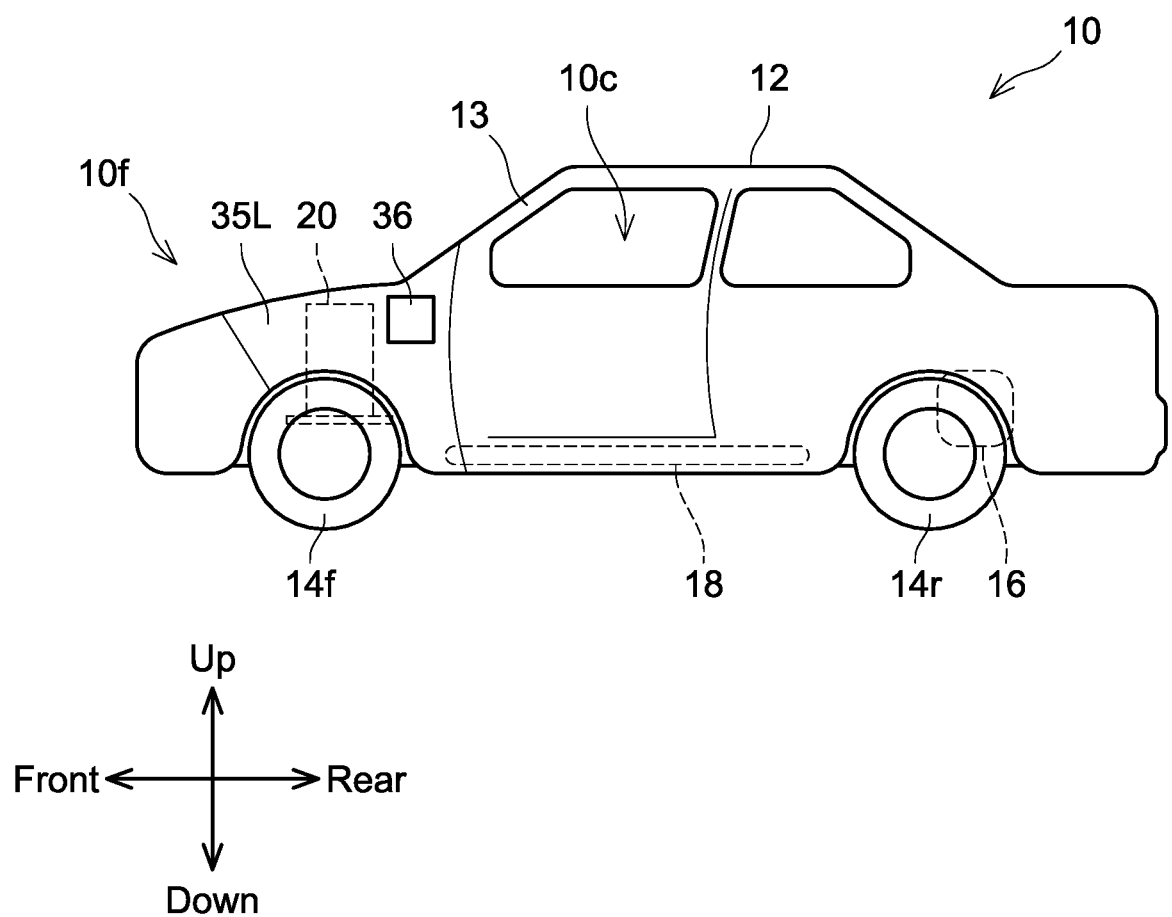
FIG. 1 is a diagram schematically showing a configuration of an electric vehicle 10 according to an embodiment.

In an embodiment of the electric vehicle disclosed herein, the electric vehicle may comprise: a cowl; a charging lid disposed outward of the cowl in a vehicle width direction, and a charging cable disposed between the cowl and the charging lid. A drain hole is defined in a bottom wall of the cowl. The bottom wall of the cowl may comprise a first bottom wall portion and a second bottom wall portion. The first bottom wall portion is located more proximate to a central portion of the cowl than the second bottom wall portion. The second bottom wall portion is located between the first bottom wall portion and the drain hole and is adjacent to the drain hole. The first bottom wall portion and the second bottom wall portion may be disposed adjacent to each other. An inclination angle of a surface of the second bottom wall portion is greater than an inclination angle of a surface of the first bottom wall portion.

In the electric vehicle of the above embodiment. the surface of the second bottom wall portion may comprise a curved surface, wherein an inclination angle of the curved surface increases along a direction from the central portion toward an edge of the cowl. The surface of the second bottom wall portion may be entirely configured with a curved surface, or may be configured with a combination of a curved surface and a flat surface. By virtue of the surface of the second bottom wall portion having a curved surface, solid matter such as fallen leaves can be discharged smoothly from the drain hole.

The electric vehicle of the above embodiment may further comprise an opposing wall opposing the second bottom wall portion. The opposing wall may be a structural part of the cowl integrally formed with the cowl, or may be a portion separate from the cowl. A surface of the opposing wall may be inclined downward along a direction from the central portion toward an edge of the cowl. With such an opposing wall disposed, the tip of solid matter such as fallen leaves is guided by the opposing wall toward the drain hole, by which the solid matter such as fallen leaves can be discharged smoothly from the drain hole. The surface of the opposing wall may be configured with, but not particularly limited to, a flat surface.

In the electric vehicle of the above embodiment, the surface of the first bottom wall portion may be configured with a flat surface. The opposing wall may be located at a position where the opposing wall crosses a virtual surface defined by extending the surface of the first bottom wall portion. With the opposing wall located in such a positional relationship, it is ensured that the tip of solid matter such as fallen leaves that has flowed along the first bottom wall portion makes contact with the opposing wall. Thereby, the tip of the solid matter such as fallen leaves can be guided preferably by the opposing wall toward the drain hole, by which the solid matter such as fallen leaves can be discharged smoothly from the drain hole.

The electric vehicle of the above embodiment may further comprise: an electrical unit disposed in an engine room: an apron upper member disposed outward of the cowl in the vehicle width direction: a fender panel disposed outward of the apron upper member in the vehicle width direction; and a charging port disposed between the apron upper member and the fender panel. The charging lid may be formed at the fender panel. The charging port may be located at a position where the charging port is exposed from an opening of the fender panel when the charging lid is opened. The charging cable may connect the charging port to the electrical unit, and comprise a portion which is arranged between the apron upper member and the fender panel.

EMBODIMENT

With reference to the drawings, an electric vehicle 10 according to an embodiment will be described. As shown in FIG. 1, the electric vehicle 10 includes a body 12 and a plurality of wheels 14f, 14r. The body 12 is constituted of, but not particularly limited to, metal. The plurality of wheels 14f, 14r includes a pair of front wheels 14f and a pair of rear wheels 14r. The number of the wheels 14f, 14r is not limited to four.

The electric vehicle 10 further includes a motor 16, a battery unit 18, and an electric unit 20. The motor 16 drives at least one of the plurality of wheels 14f, 14r (e.g., the pair of rear wheels 14r). The motor 16 is connected to the battery unit 18 via the electric unit 20. The battery unit 18 incorporates a plurality of secondary battery cells and is configured to be repeatedly charged by external electric power.

The electric unit 20 is disposed in an engine room and includes a power converter 22 (see FIG. 3) such as a DC-DC converter and/or an inverter. The electric unit 20 is configured to regulate electric power to be supplied from the battery unit 18 to the motor 16. The power converter 22 is further configured to regulate electric power supplied from an external power source and charge the battery unit 18.

Figure 2:
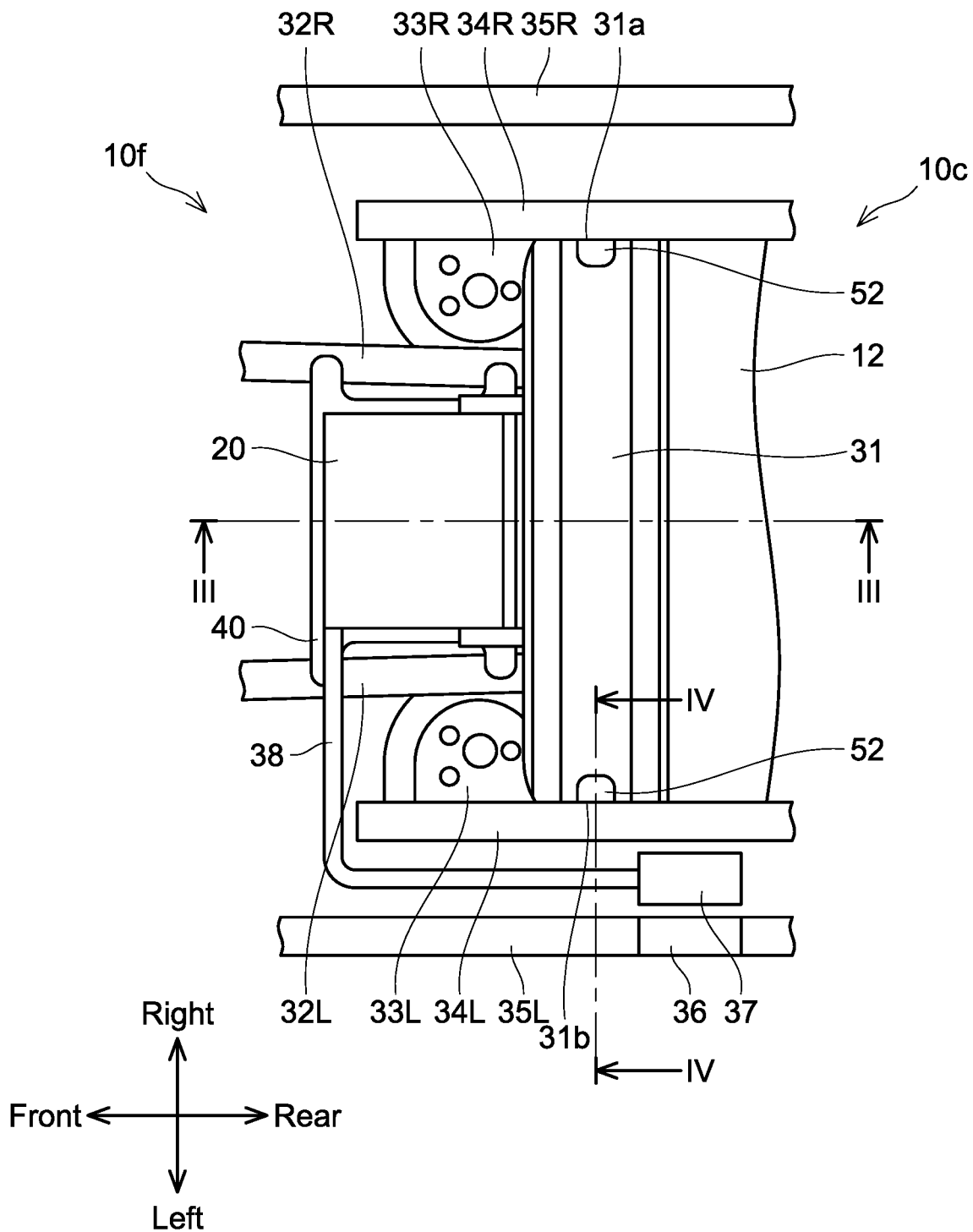
FIG. 2 is a diagram schematically showing a front structure 10f of the electric vehicle 10.
Figure 3:
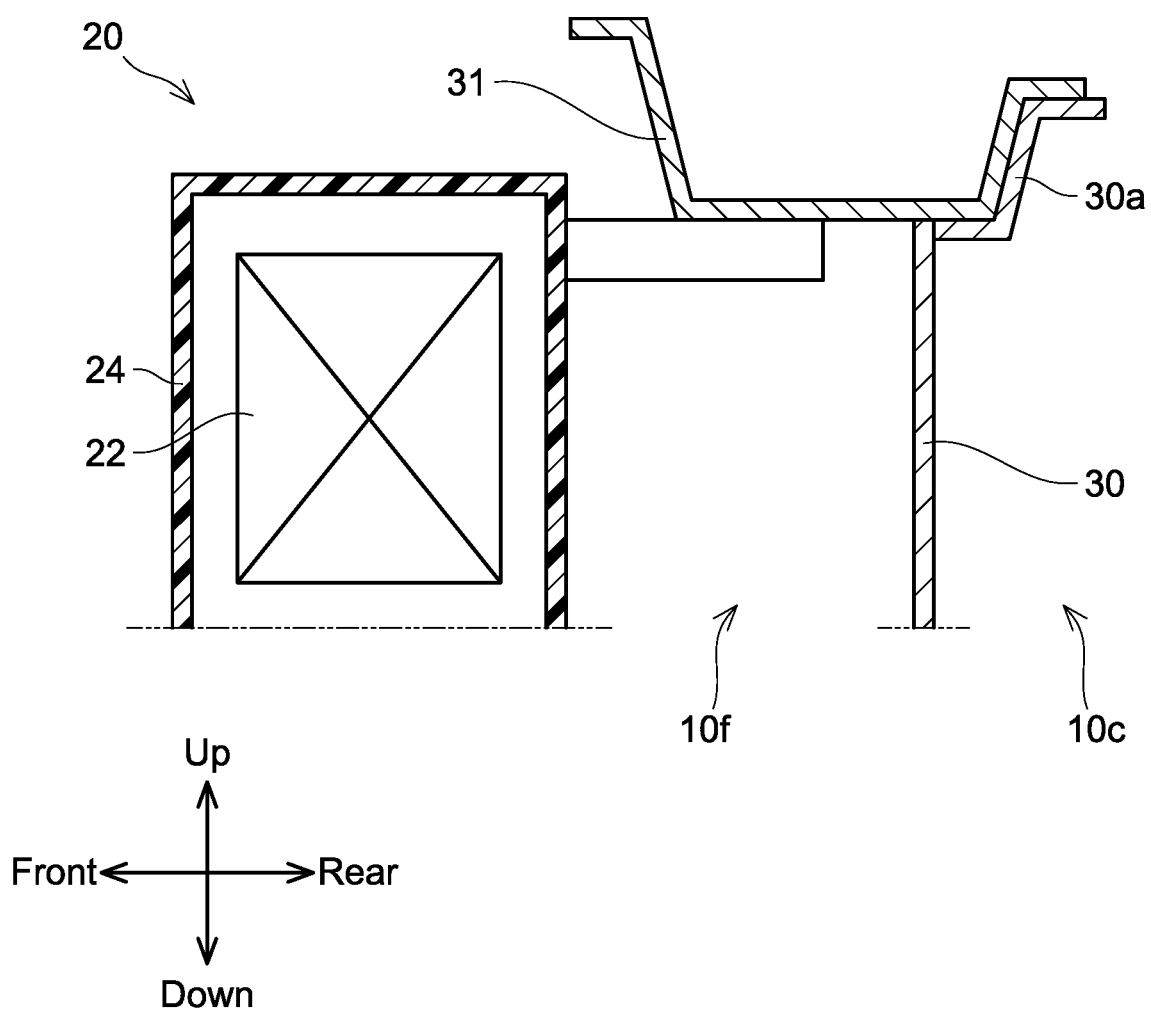
FIG. 3 is a cross-sectional view perpendicular to a vehicle width direction and taken along a line III-III in FIG. 2.

A front structure 10f of the electric vehicle 10 will hereinafter be described with reference to FIGS. 1 to 3. The body 12 includes a dash panel 30, a cowl 31, a pair of a right front side member 32R and a left front side member 32L, a pair of a right suspension tower 33R and a left suspension tower 33L, a pair of a right apron upper member 34R and a left apron upper member 34L, and a pair of a right fender panel 35R and a left fender panel 35L.

The dash panel 30 defines a boundary between the front structure 10f of the electric vehicle 10 and a cabin 10c located rearward of the front structure 10f.

To prevent entry of rainwater or the like into the engine room, the cowl 31 is disposed between a windshield (not shown) and a hood (not shown) and extends along a vehicle width direction (a right-left direction in the drawings). The cowl 31 in the present embodiment is a plate material having a hat shape in a cross-section perpendicular to the vehicle width direction. The cowl 31 is fixed to an upper portion 30a of the dash panel 30, and its opposite edges 31a, 31b are respectively fixed to the suspension towers 33R, 33L. The opposite edges 31a, 31b of the cowl 31 may be respectively fixed to the apron upper members 34R, 34L in place of or in addition to the suspension towers 33R, 33L. A pair of drain holes 52 is defined in a bottom wall of the cowl 31. Each of the drain holes 52 is defined in the bottom wall at a position adjacent to corresponding one of the opposite edges 31a, 31b. Rainwater or the like that has entered the cowl 31 flows in a hat-shaped groove along the vehicle width direction and is drained through the drain holes 52. The structure of the cowl 31 in relation to the drain holes 52 will be described below.

The pair of the right front side member 32R and the left front side member 32L extends frontward from a lower portion of the dash panel 30. A mount frame 40 is fixed to the pair of the front side members 32R, 32L, and the electric unit 20 is fixed onto the mount frame 40. The electric unit 20 includes a housing 24 for housing the power converter 22 mentioned above. The housing 24 is constituted of an electrically-insulating material and electrically insulates the power converter 22 from the body 12.

The right suspension tower 33R and the left suspension tower 33L are respectively located outward of the front side members 32R, 32L in the vehicle width direction, and define spaces for housing suspensions.

The right apron upper member 34R and the left apron upper member 34L are respectively located outward of the suspension towers 33R, 33L and are located outward of the cowl 31 in the vehicle width direction, and extend frontward of the dash panel 30.

The right fender panel 35R and the left fender panel 35L are respectively located outward of the apron upper members 34R, 34L in the vehicle width direction and extend in a vehicle front-rear direction. A charging lid 36 is disposed at an upper rear portion of the left fender panel 35L, in other words, at a position in proximity to a lower edge of a pillar 13. The charging lid 36 is located, but not particularly limited to, rearward of the cowl 31 and at a height approximately equal to the height at which the cowl 31 is located when viewed from a lateral side of the vehicle.

The electric vehicle 10 further includes a charging port 37 to which a connector for the external power source (e.g., a commercial power source) is connected, and a charging cable 38 that connects the charging port 37 to the electric unit 20.

The charging port 37 is disposed in a space between the left apron upper member 34L and the left fender panel 35L, and is located at a position where the charging port 37 is exposed from an opening of the left fender panel 35L when the charging lid 36 is opened.

The charging cable 38 is arranged in the space between the left apron upper member 34L and the left fender panel 35L and in the engine room, such that the charging cable 38 connects the charging port 37 to the electric unit 20. The charging cable 38 extends toward the front of the vehicle from a side portion of the charging port 37 through the space between the left apron upper member 34L and the left fender panel 35L, bends at a position frontward of a front edge of the left apron upper member 34L, extends in the engine room along the vehicle width direction, and is connected to the electric unit 20. A part of the charging cable 38 that extends through the space between the left apron upper member 34L and the left lender panel 35L extends across the cowl 31 when viewed from the lateral side of the vehicle. Although only a single charging cable 38 is shown in this example for clearer illustration, one or more charging cables 38 may be arranged.

Figure 4:
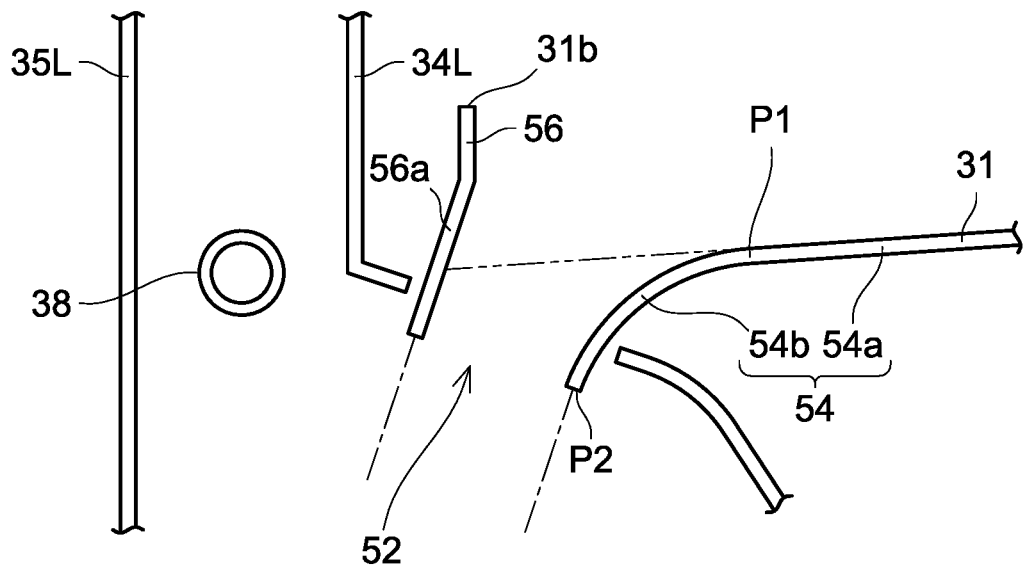
FIG. 4 is a cross-sectional view perpendicular to a vehicle front-rear direction and taken along a line IV-IV in FIG. 2.

FIG. 4 shows a cross-sectional view showing the drain hole 52 defined in the edge 31b of the cowl 31 on the left side of the vehicle, and the vicinity of the drain hole 52. This cross section is perpendicular to the vehicle front-rear direction and is obtained when the vehicle is viewed from its rear to its front. The drain hole 52 is defined in a bottom wall 54 of the cowl 31 at a position adjacent to the edge 31b. In other words, the drain hole 52 is adjacent to a side wall 56 that defines the edge 31b of the cowl 31, and is defined by the bottom wall 54 and the side wall 56. The drain hole 52 opens downward and is exposed to the space between the left apron upper member 34L and the left fender panel 35L. Here, long and short one-dot-chain lines extending from an edge of a rim portion that defines the drain hole 52 are virtual lines extending from the edge of the rim portion in a direction parallel to the rim portion. The charging cable 38 is located at a position higher than a region surrounded by these long and short one-dot-chain lines. The charging cable 38 is thereby avoided from being wetted by rainwater or the like drained from the drain hole 52.

The bottom wall 54 of the cowl 31 includes a first bottom wall portion 54a and a second bottom wall portion 54b. The bottom wall 54 of the cowl 31 may include another bottom wall portion in addition to the bottom wall portions 54a, 54b. For example, another bottom wall portion may be disposed more proximate to a central portion of the cowl 31 than the second bottom wall portion 54h, or between the first bottom wall portion 54a and the second bottom wall portion 54b.

The first bottom wall portion 54a is a portion located more proximate to the central portion of the cowl 31 than the second bottom wall portion 54b. In this example, the first bottom wall portion 54a is configured to include the central portion of the cowl 31 and extends from the central portion of the cowl 31 to the second bottom wall portion 54b. The first bottom wall portion 54a has a surface configured with a flat surface and slightly inclined downward along a direction from the central portion of the cowl 31 toward the edge 31b. Here, an inclination angle of the surface of the first bottom wall portion 54a is defined as an angle that the surface of the first bottom wall portion 54a forms with the horizontal surface in a cross section perpendicular to the vehicle front-rear direction.

The second bottom wall portion 54b extends between the first bottom wall portion 54a and the drain hole 52 and is adjacent to the drain hole 52. A surface of the second bottom wall portion 54b is configured with a curved surface, an inclination angle of which increases along the direction from the central portion of the cowl 31 toward the edge 31b. Specifically, the inclination angle of the surface of the second bottom wall portion 54b monotonously increases from its first periphery point P1, which is a periphery more proximate to the first bottom wall portion 54a, toward its second periphery point P2, which is a periphery more proximate to the drain hole 52. Here, the inclination angle of the surface of the second bottom wall portion 54b is defined as an angle that the horizontal surface forms with a tangent to any point on the surface of the second bottom wall portion 54b in a cross section perpendicular to the vehicle front-rear direction. As such, the inclination angle of the surface of the second bottom wall portion 54b at any point is configured to be greater than the inclination angle of the surface of the first bottom wall portion 54a. The inclination angle of the second bottom wall portion 54b at the second terminal point P2 may be, but not particularly limited to, 30 degrees or greater, or may be 45 degrees or greater. A length of the second bottom wall portion 54h in the vehicle width direction, namely, a length thereof from the first periphery point P1 to the second periphery point P2 in the vehicle width direction may be, but not particularly limited to, 20 to 150 mm, or may particularly be 40 to 100 mm.

The side wall 56 of the cowl 31 includes an opposing wall 56a opposing the second bottom wall portion 54b. A surface of the opposing wall 56a is configured with a flat surface and inclined downward along the direction from the central portion of the cowl 31 toward the edge 31b. Here, a two-dot-chain line that extends from the first bottom wall portion 54a indicates a virtual surface defined by extending the surface of the first bottom wall portion 54a. The opposing wall 56a is located at a position where the opposing wall 56a crosses this virtual surface.

Figure 5:
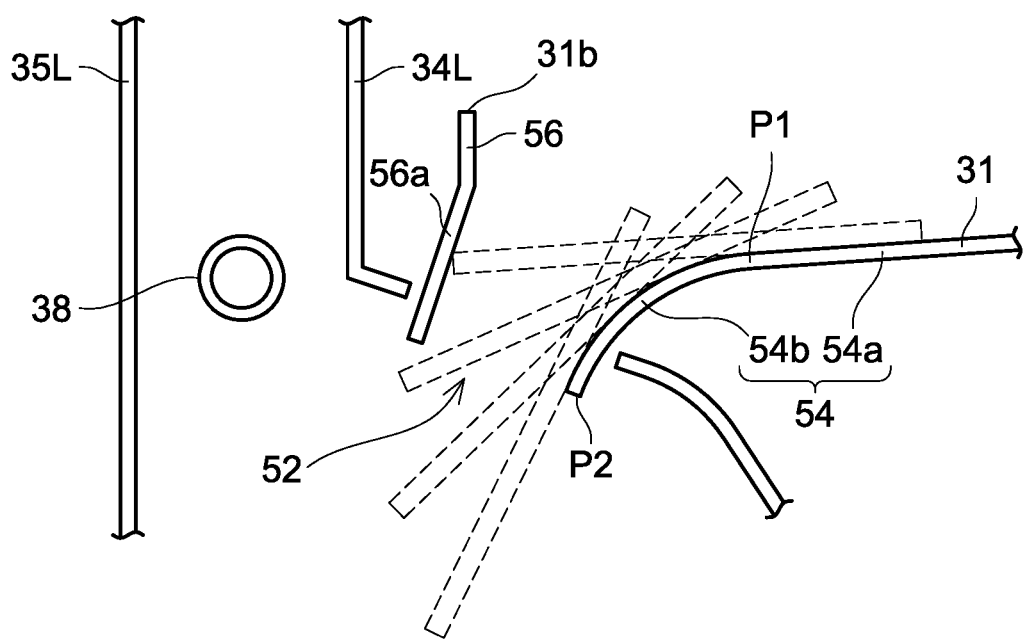
FIG. 5 is an explanatory diagram of FIG. 4, showing how solid matter such as pine needles is discharged through a drain hole 52 of a cowl 31.

FIG. 5 shows how elongated solid matter is discharged from the drain hole 52. Examples of such solid matter include small branches, leaves of conifers, and the like. Usually, such elongated solid matter has a disadvantage that it is difficult to discharge from the drain hole 52 defined in the bottom wall 54. In the cowl 31 of the present embodiment, however, the inclination angle of the surface of the second bottom wall portion 54b is made large, by which the elongated solid matter can flow on the surface of the second bottom wall portion 54h with its longitudinal axis oriented downward. Consequently, the cowl 31 of the present embodiment enables smooth discharge of the elongated solid matter from the drain hole 52. Moreover, by virtue of the opposing wall 56a being disposed, the tip of the elongated solid matter is guided by the opposing wall 56a toward the drain hole 52 and the elongated solid matter can flow on the surface of the second bottom wall portion 54b with its longitudinal axis oriented downward. Consequently. the cowl 31 in the present embodiment enables the smooth discharge of the elongated solid matter from the drain hole 52. As such, the cowl 31 of the present embodiment can prevent the charging cable 38 from being wetted by water while reducing faulty discharge of the elongated solid matter.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. An electric vehicle comprising:
   a cowl;
   a charging lid disposed outward of the cowl in a vehicle width direction, and
   a charging cable disposed between the cowl and the charging lid, wherein a drain hole is defined in a bottom wall of the cowl, the bottom wall of the cowl comprises a first bottom wall portion and a second bottom wall portion, the first bottom wall portion is located more proximate to a central portion of the cowl than the second bottom wall portion, the second bottom wall portion is located between the first bottom wall portion and the drain hole and is adjacent to the drain hole, and an inclination angle of a surface of the second bottom wall portion is greater than an inclination angle of a surface of the first bottom wall portion.

2. The electric vehicle according to claim 1, wherein the surface of the second bottom wall portion comprises a curved surface, wherein an inclination angle of the curved surface increases along a direction from the central portion toward an edge of the cowl.

3. The electric vehicle according to claim 1, further comprising:

an opposing wall opposing the second bottom wall portion, wherein a surface of the opposing wall is inclined downward along a direction from the central portion toward an edge of the cowl.

4. The electric vehicle according to claim 3, wherein the surface of the opposing wall is configured with a flat surface.

5. The electric vehicle according to claim 3, wherein the surface of the first bottom wall portion is configured with a flat surface, and the opposing wall is located at a position where the opposing wall crosses a virtual surface defined by extending the surface of the first bottom wall portion.

6. The electric vehicle according to claim 1, further comprising:

an electrical unit disposed in an engine room;

an apron upper member disposed outward of the cowl in the vehicle width direction;

a fender panel disposed outward of the apron upper member in the vehicle width direction; and a charging port disposed between the apron upper member and the fender panel, wherein the charging lid is formed at the fender panel, the charging port is located at a position where the charging port is exposed from an opening of the fender panel when the charging lid is opened, and the charging cable connects the charging port to the electrical unit, and comprises a portion which is arranged between the apron upper member and the fender panel.

* * * * *